United States Patent
Kumar et al.

(10) Patent No.: US 11,620,311 B1
(45) Date of Patent: Apr. 4, 2023

(54) TRANSFORMATION OF DIRECTED GRAPH INTO RELATIONAL DATA

(71) Applicant: Amazon Technologies, Inc., Seattle, WA (US)

(72) Inventors: Hitesh Kumar, Seattle, WA (US); Vaibhav Selot, Baldeobagh (IN)

(73) Assignee: Amazon Technologies, Inc., Seattle, WA (US)

( * ) Notice: Subject to any disclaimer, the term of this patent is extended or adjusted under 35 U.S.C. 154(b) by 638 days.

(21) Appl. No.: 15/238,632

(22) Filed: Aug. 16, 2016

(51) Int. Cl.
  *G06F 16/28* (2019.01)
  *G06F 16/25* (2019.01)
  *G06F 16/901* (2019.01)

(52) U.S. Cl.
  CPC .......... *G06F 16/283* (2019.01); *G06F 16/254* (2019.01); *G06F 16/258* (2019.01); *G06F 16/9024* (2019.01)

(58) Field of Classification Search
  CPC ......... G06F 17/30592; G06F 17/30563; G06F 16/283; G06F 16/258; G06F 16/254; G06F 16/9024
  See application file for complete search history.

(56) References Cited

U.S. PATENT DOCUMENTS

| | | | | |
|---|---|---|---|---|
| 5,201,046 A | * | 4/1993 | Goldberg | G06Q 10/087 |
| 2004/0244012 A1 | * | 12/2004 | Massarenti | G06F 9/4493 719/319 |
| 2010/0161668 A1 | * | 6/2010 | Strenge | G06F 16/22 707/791 |
| 2013/0103657 A1 | * | 4/2013 | Ikawa | G06F 17/30985 707/693 |
| 2013/0117326 A1 | * | 5/2013 | De Smet | G06F 9/4488 707/798 |

\* cited by examiner

*Primary Examiner* — Jensen Hu
(74) *Attorney, Agent, or Firm* — Davis Wright Tremaine LLP

(57) ABSTRACT

A key-value database may maintain a collection of data in which the value components are serialized object graphs. The object graphs may be deserialized and converted to a directed graph. Each node may represent an entity and each edge a relationship between entities. Instructions associated with a table may indicate criteria for identifying corresponding entities in a directed graph. A row of the table may be created for each entity having a unique permutation of identifying properties. Column values may be obtained using instructions for accessing entity properties and mapping from the properties to column values.

20 Claims, 8 Drawing Sheets

TRANSFORMATION OF DIRECTED GRAPH INTO RELATIONAL DATA

BACKGROUND

Distributed key-value databases are often used to store data in transaction-oriented systems. The key-value databases in such systems may typically employ loosely structured data formats, or schemas. For example, the key-value pairs maintained by such a system may not conform to any particular organization in the since that each value may comprise data of a different format or internal structure.

Transaction-oriented systems are, however, often called upon to be a source of data for purposes, such as data mining or analytical processing, that require conformance to a schema. Examples include data warehouse systems used to perform data mining, analytic processing, and other similar applications. These systems may typically employ relational database schemas in which data conforms to stringently applied row-and-column formats. Converting loosely-structured data, particularly binary data, to row-and-column formats may present a variety of technical challenges.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products related to converting loosely-structured binary data to relational data. In particular, techniques described herein may be applied to scenarios that include converting serialized object graphs to a relational format. The format may include tables whose rows may be populated using data extracted from a directed graph.

In an example, a key-value database system may store binary object graphs in the value components of a key-value collection of data. The binary object graphs may be converted into a directed graph format in which each node of the graph represents an entity and each edge of the graph represents relationships between entities. The data may be converted to a number of rows, where each row consists of a number of columns, by application of graph queries to the directed graph. The graph queries may identify the number of unique entity permutations and create a corresponding number of relational data rows. Column values for the rows may be obtained by application of graph queries associated with column values.

In an example, a system for converting serialized object graphs to relational data may comprise a store of data, such as a key-value database, in which the values comprise serialized objects. The serialized objects may be loaded into memory to form an object graph. The system may convert the object graph to a directed graph in which each node represents an entity and in which the edges of the graph represent relationships between entities. The conversion may comprise collapsing or expanding object graph nodes into a one-node-per-entity format. Each node of the directed graph may also be formed to contain a type identifier which identifies the type of entity that the node represents, and one or more instance identifiers. The instance identifiers may correspond to a key value, or a compound key value.

The system may receive first instructions for identifying root nodes in the directed graph, where the root nodes correspond to entities of a particular type. The instructions may be applied to obtain a set of nodes that correspond to that type. This set of nodes may be further reduced to exclude duplicate entities. This may be done by identifying unique permutations of identifying entity properties.

The subset of nodes so identified may therefore represent the unique set of entities contained in the directed graph. A number of relational database rows corresponding to this set of nodes may then be created. The column values for these rows may be obtained by applying a second set of instructions, which may be referred to as entity property access instructions, which provide information usable to obtain property values associated with an entity and to map those values to columns of a row.

Figure 1:
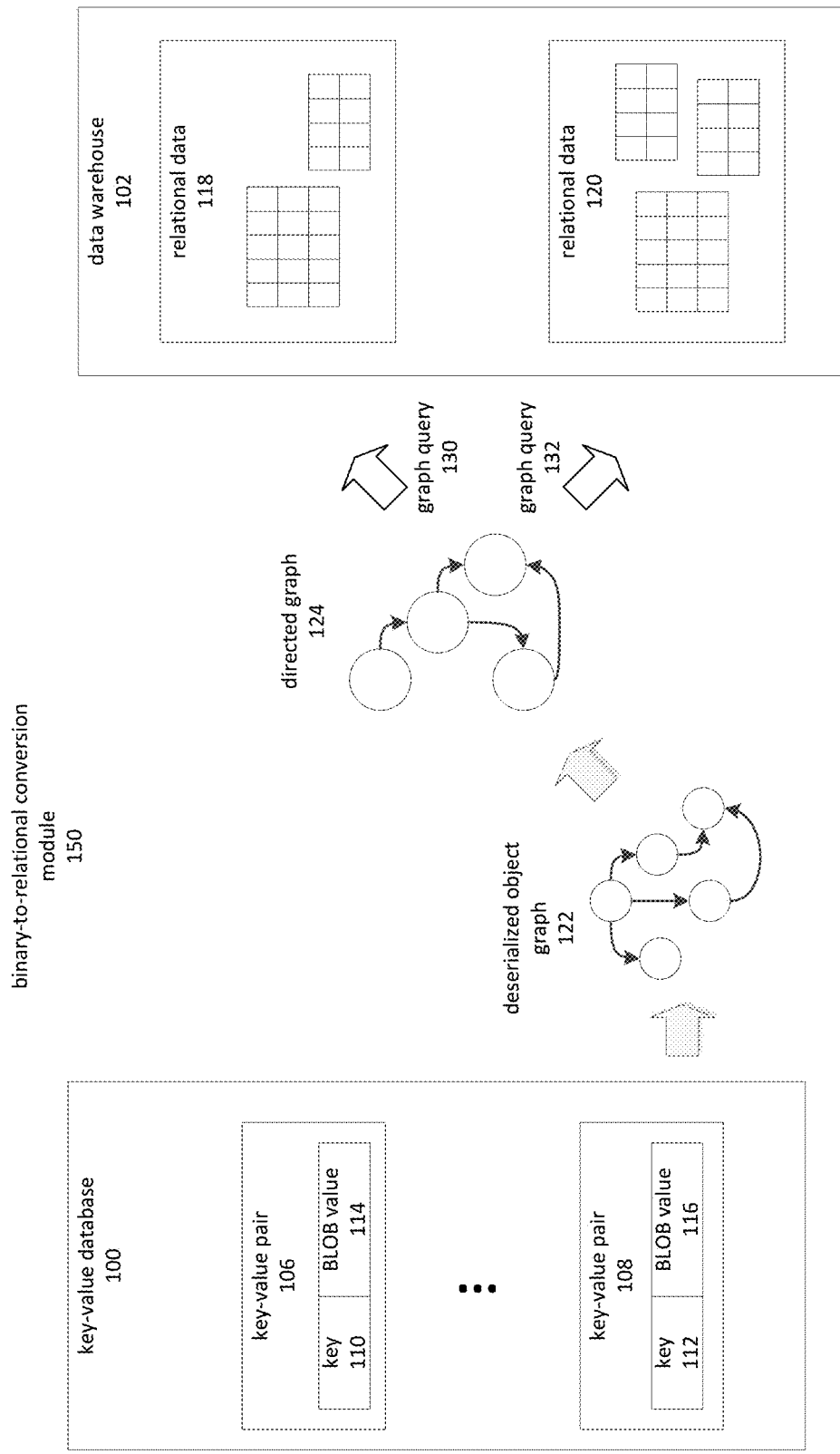
FIG. 1 is a block diagram depicting data transfer between a key-value database system and a relational database system.

FIG. 1 is a block diagram depicting data transfer between a key-value database system and a relational database system. A key-value database 100 may maintain collections of key-value pairs. Access to a collection of key-value pairs may typically be performed by specifying a key and retrieving a corresponding value or set of values. Similarly, data may be stored in the collection by providing a value and a corresponding key. The values may include binary data, sometimes referred to as binary large object ("BLOB") data. Binary data may be used to represent complex data types that have been serialized. More generally, binary data may be used to store serialized object graphs. Serialization refers to the process of converting an in-memory representation of an object, sometimes referred to as a binary representation of the object, to one that is suitable for storing on a long-term storage device, such as a solid state or mechanical disk drive. In a serialized object graph, relationships between objects may be retained in the on-disk representation, and remain when the object graph is deserialized. The deserialization process may, for example, involve loading the serialized object from a long-term storage device back into a binary representation of the object that is stored in volatile memory. More generally, deserialization may refer to processes that involve retrieval or access to an object graph that has been persisted to a storage device, or to conversion between two different binary representations of the object graph and the objects included in the graph.

The key-value database 100 may, for illustrative purposes, be presumed to contain a collection of key-value pairs 106, 108. Although a collection of key-value pairs 106, 108 may contain a variety of data types, the key-value pairs 106, 108 depicted in FIG. 1 are shown to contain BLOB values 114, 116 indexed by corresponding keys 110, 112.

A binary-to-relational conversion module 150 may retrieve a blob value 116 from the collection of key-value pairs 106, 108 and convert the blob value 116 into a deserialized object graph 122. It may be the case that the deserialized object graph 122 obtained by loading the BLOB value 116 may have a different structure than other object graphs that might be obtained from other key-value pairs 106. The structure of the binary data maintained by the key-value database 100 may therefore be said to be diverse, and to result in diverse object graphs when deserialized into memory.

The binary-to-relational conversion module 150 may convert the deserialized object graph 122 to a directed graph 124. The direct graph may be partially normalized, so that each node represents an entity and contains a set of standardized properties typically comprising a type indicator and one or more identifiers.

The binary-to-relational conversion module 150 may receive configuration information related a set of graph queries 130, 132 to relational data 118, 120 stored in a data warehouse 102. The relational data 118, 120 may, in some cases, correspond to relational database tables. The graph queries 130, 132 may comprise instructions for identifying and extracting entities in the directed graph 124 and for identifying and extracting properties of those entities from the directed graph 124.

In an example, the binary-to-relational conversion module 150 may identify a subset of nodes in the directed graph that are associated with a particular entity type. The graph query 130 may include criteria for identifying the entity type. These nodes may be referred to as root nodes or base nodes. The subset may be identified by traversing the directed graph and identifying nodes that correspond to the specified entity type. The subset of nodes may be further restricted to those that represent unique entities by identifying unique permutations of identifying entity properties. For example, certain properties of an entity may correspond to components of a primary key or compound primary key. As used herein, the terms primary key and compound primary key may be used interchangeably to refer to one or more properties that identify an entity. Unique permutations of these properties may correspond to a unique entity.

The binary-to-relational conversion module 150 may then form a number of rows of a table, such that the number of rows is equivalent to the number of rows in the subset. Nodes that possess non-unique permutations may be treated as being related to the same instance of the unique entity. The duplicate entities may still be accessed to obtain column values for the row, and accordingly may be linked to the nodes that remain in the identified subset of nodes.

The binary-to-relational conversion module 150 may form a row based on each of the identified subset of nodes, and on nodes linked to those in the subset. Column values for the rows may be based on instructions in the query for accessing column values related to a node in the subset, i.e. in those nodes linked to a root node.

A second graph query 132 may be applied to the directed graph 124 in a similar manner. The binary-to-relational conversion module 150 may use the graph query 132 to identify root nodes of the directed graph 124. This set of root nodes may then be reduced to a set of root nodes having unique permutations of identifying properties. The nodes in this set may each correspond to an entity that is to be converted into a row of relational data. The binary-to-relational conversion module 150 may then use instructions provided in the query to traverse nodes linked to the root nodes and locate properties corresponding to the entities. These entity properties may be accessed to obtain column values for the corresponding row of relational data 120.

Figure 2:
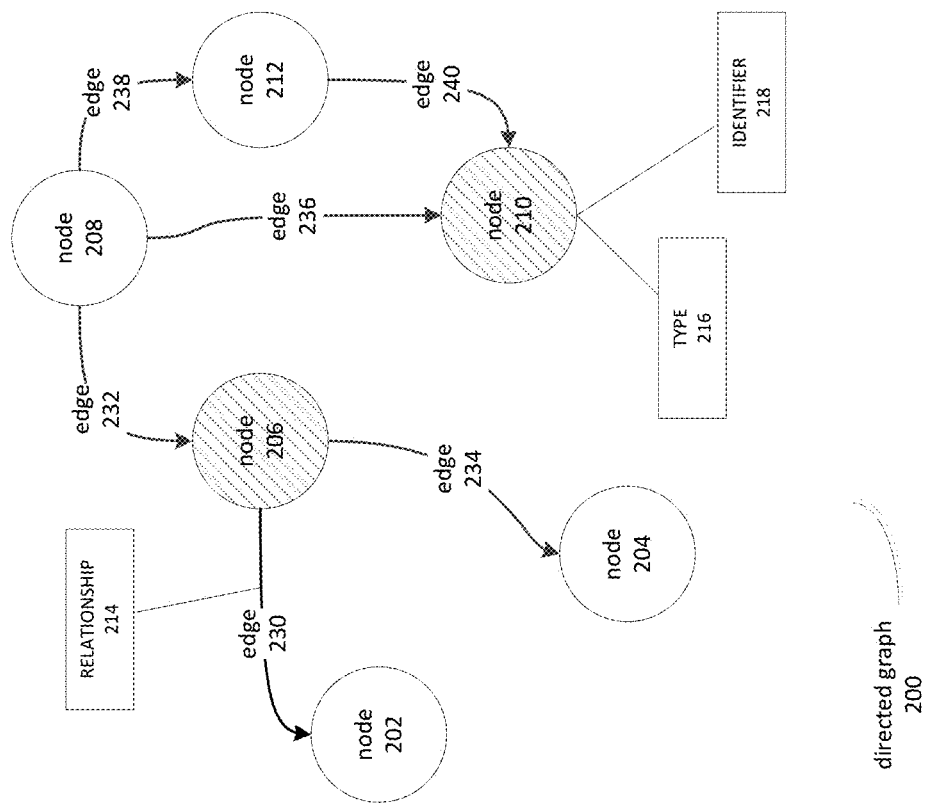
FIG. 2 is a block diagram depicting a directed graph.

FIG. 2 is a block diagram depicting a directed graph. In particular, the directed graph depicted by FIG. 2 is adapted for use with graph queries used to convert data to a relational format. This type of directed graph 200 may comprise nodes 202-212 and edges 230-240. The edges 230-240 may be directional, such that nodes may be traversed in an order directed by an edge. For example, possible traversals from a node 206 include traversing from node 206 to node 202, and from node 206 to node 204.

The directed graph 200 may be converted from an object graph, such that in the resulting directed graph 200 each node 202-212 represents an entity and each edge 230 represents a relationship between entities. Note that this may, in some instances, involve a compression of the nodes of the object graph. For example, in an object graph a first node may represent and entity, and might be linked to a second node which represents certain properties of the entity. In the directed graph 200, each of the nodes 202-212 represents a complete, but not necessarily distinct, entity. It might be the case, for example, that a first node 208 and a second node 212 each correspond to the same instance of an entity. Each of the nodes 208, 212 would, in this case, have the same entity type and the same identifier(s) corresponding to a primary key.

In the directed graph 200, the edges 230-240 may represent relationships between nodes. For example, a first node 206 may be linked to a second node 202 by an edge 230 which represents a relationship 214 between the first and second nodes 206, 202. For example, the first node 206 might represent a customer entity, and the second node 202 might represent an order. The relationship 214 as represented by the edge 230 might represent the order being one of the customer's orders.

The nodes 202-212 of the directed graph may each include information indicative of the type of entity represented by the node and one or more values which identify the particular instance of the entity. For example, a node 210 may include a type 216 field indicating that it represents an "order" entity and an identifier 218 field specifying an order number.

The binary-to-relational conversion module may form rows of a relational database table by applying a graph query to a directed graph. The process of applying a query may involve what may be loosely described as a two-stage process that firstly involves identification of unique entities that are to correspond to rows of the relational database table, and secondly involves extraction of corresponding properties of the entities from the directed graph.

Figure 3:
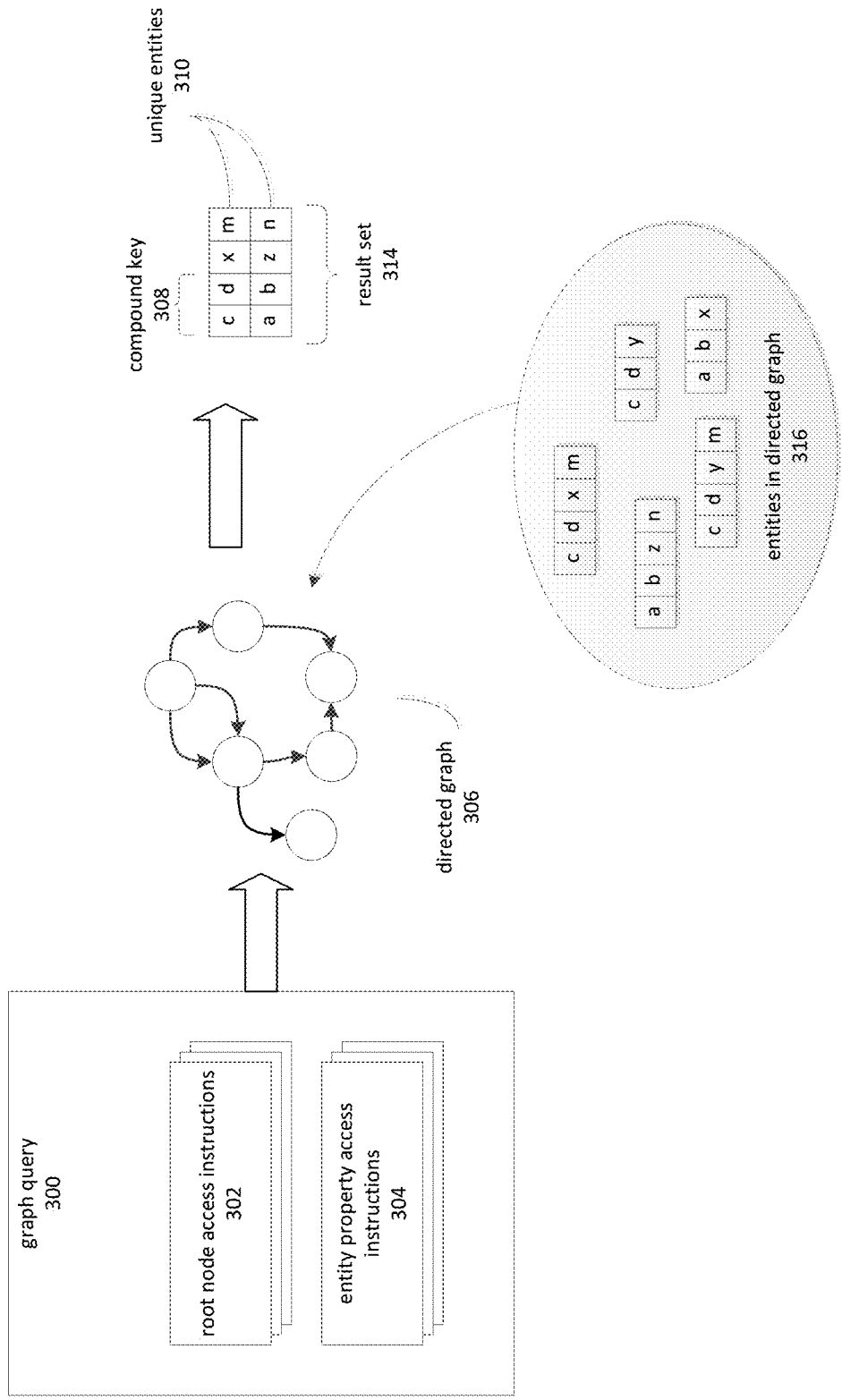
FIG. 3 is a block diagram depicting the identification of distinct entities in a directed graph by application of a graph query.

FIG. 3 is a block diagram depicting the identification of distinct entities in a directed graph by application of a graph query. A directed graph 306 may comprise nodes corresponding to entities and edges corresponding to relationships between entities, similarly to the directed graph 200 that FIG. 2 depicts. A given directed graph 306 may be used to generate multiple tables through the use of different graph queries, such as the depicted graph query 300. For example, a first graph query might be associated with a "customers" table and applied by the binary-to-relational conversion module to extract customer entities from a directed graph and load them into the "customers" relational database table. Similarly, a second graph query might be associated with an "orders" table, and used by the binary-to-relational conversion module to extract order entities from the same directed graph and load them into the "orders" table.

In various embodiments, as described herein, the directed graph 306 depicted in FIG. 3 may be formed by translating a deserialized object graph. The deserialized object graph may have been obtained as the value component of a key-value pair maintained by a key-value database. In some instances a database table may be populated by repeatedly deserializing the binary portion of key-value pairs, converting the deserialized binary to a directed graph, and applying a graph query 300 to extract distinct entities and corresponding entity properties.

The graph query 300 may comprise two subcomponents, a set of root node access instructions 302 and entity property instructions 304. These may, in various embodiments, comprise configuration elements, subqueries, path expressions, procedures, functions, and other code or data which may be applied to the directed graph 306.

The root node access instructions 302 may be applied to the directed graph 306 in a traversal procedure. In a traversal, nodes of the graph are visited in succession beginning at a starting point, and following the edges of the directed graph 306.

The root node access instructions 302 may, in some instances, comprise instructions for locating a starting point of the traversal.

The root node access instructions 302, may, in some instances, comprise instructions for comparing traversed nodes a set of criteria that identifies a root node. A root node may include a node that represents an instance of an entity that may be translated to a row of a relational database table.

The root node access instructions 302 may, in some instances, comprise instructions for performing a procedure, such as a sub-traversal, to locate data that may identify a node as a root node.

The binary-to-relational conversion module may form a result set 314 from application of the root node access instructions to the directed graph 306. It may be the case that the nodes initially identified in the directed graph 306 do not correspond precisely to unique entities 310. The directed graph 306 may include various representations of entities 316 of a given type. Some of these representations may correspond to unique instances of an entity, whereas others may represent duplicate instances. Uniqueness and duplication may be determined with respect to identifier or key values. This may, in some instances, include compound key 308 values, as is the case in the example that FIG. 3 depicts. As a further example, the directed graph 306 might contain various representations of orders placed by various customers. Some of the customer information might correspond to unique customers, while for individuals who have placed multiple orders, there might be duplicate representations of the same customer. The result set 314 of the root node query may be reduced to include only the unique customers represented in the graph. Note that in some cases, duplicate entities may be encountered as a result of traversing the graph and re-encountering a node. These duplicates may also be detected and eliminated from the result set 314 by identifying whether or not node encountered during the traversal represents a unique permutation of properties that identify an entity.

In some cases, the root node instructions may identify one or more unique entities 310, which may be translated into rows on a one-to-one basis.

In some cases, the root node instructions may identify a number of entities which may be permuted or combined in various ways to form unique rows. In these instances, various permutations or combinations of the entities identified by the root node access instructions 302 may be examined to determine which combinations result in unique compound keys. Each of these elements, combined so as to produce a unique compound key, may be translated into a relational database row.

Figure 4:
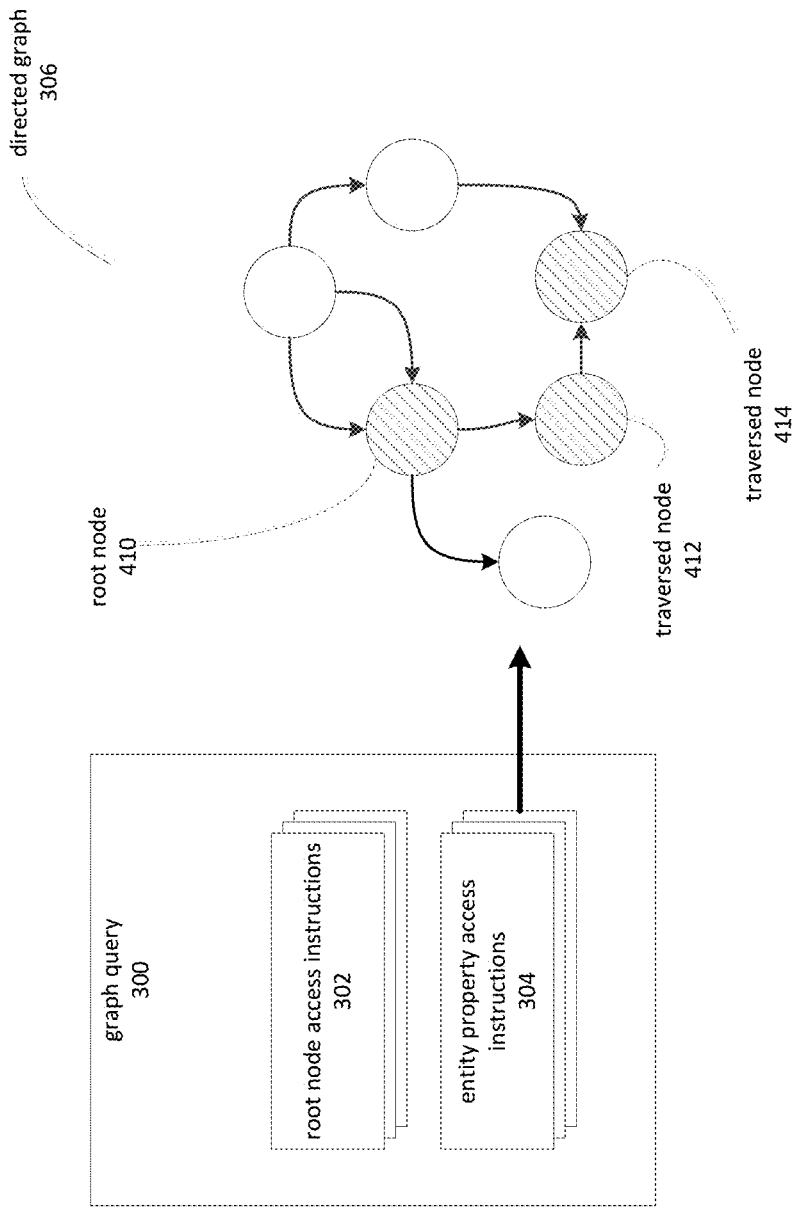
FIG. 4 is a block diagram depicting the identification of entity properties in a directed graph by application of a graph query.

FIG. 4 is a block diagram depicting the identification of entity properties in a directed graph by application of a graph query. As depicted by FIGS. 3 and 4, the graph query 300 may comprise root node access instructions 302 and entity property access instructions 304. The entity property access instructions 304 may comprise instructions indicating how properties associated with an entity may be accessed. The instructions may, in various embodiments, comprise configuration elements, subqueries, path expressions, procedures, functions, and other code or data which may be applied to the directed graph 306.

In some cases, the instructions may indicate a path or other traversal information determining a path by which a property associated with an entity may be identified. This information may be relative to a root node 410. For example, entity property access instructions 304 may indicate a path from the root node 410 to a first traversed node 412 and then to a second traversed node 414. The instructions may also map from a property of the traversed node 414 to a column of a row that is to be created to represent an entity.

Figure 5:
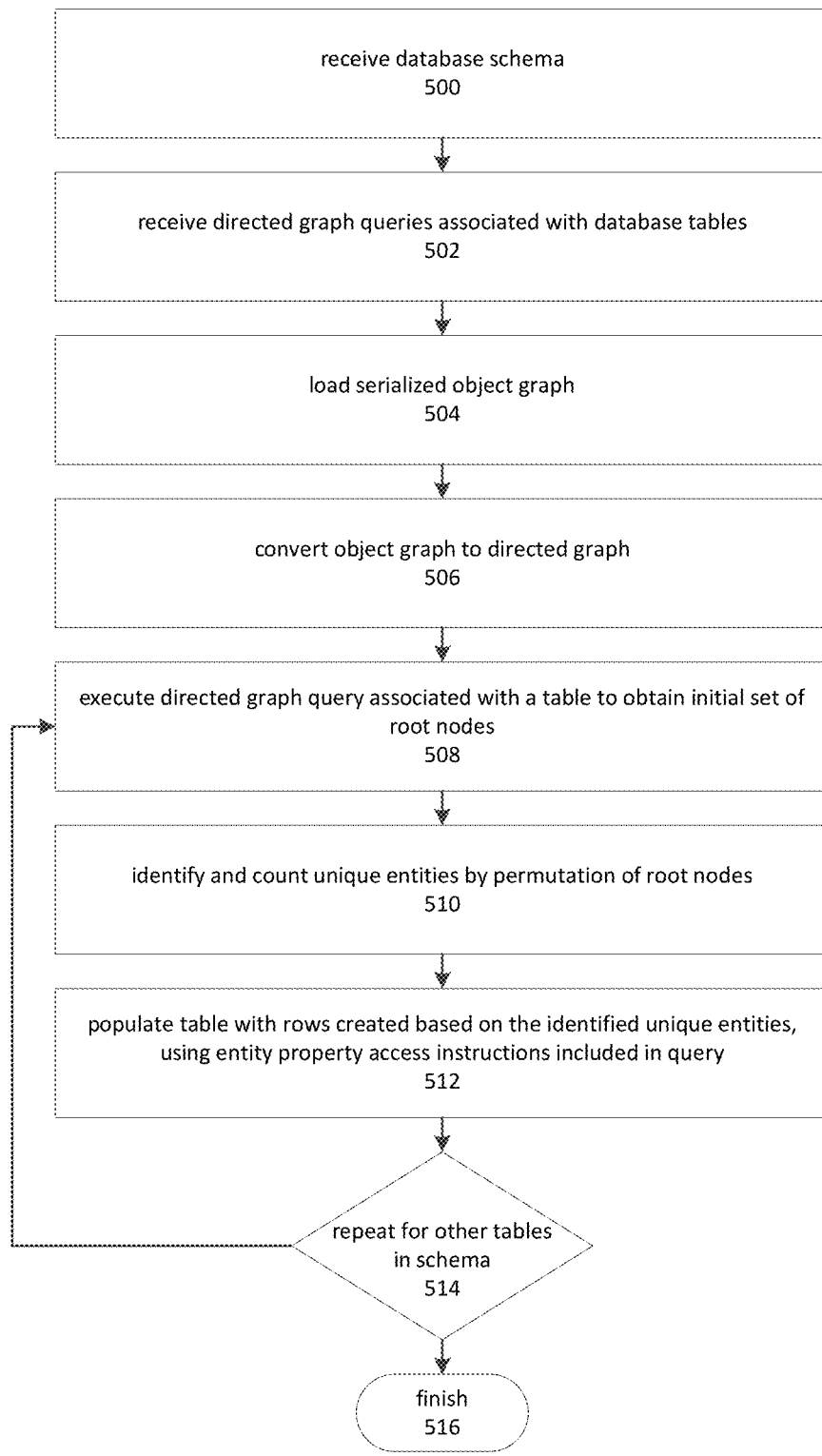
FIG. 5 is a flow diagram depicting a process for importing relational data from a store of binary data.

FIG. 5 is a flow diagram depicting a process for importing relational data from a store of binary data. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 500 depicts a binary-to-relational conversion module receiving information indicative of a database schema. This may include definitions of tables that are to be populated with data obtained from deserialized binary objects.

Block 502 depicts that the binary-to-relational conversion module may receive directed graph queries that are associated with the relational tables depicted as being received in block 500. In various embodiments, the operations of blocks 500 and 502 may be combined. For example, a single configuration file might describe relational database schemas and provide directed graph queries for obtaining data to populate the tables.

Block 504 depicts loading a serialized object graph from binary data. A serialized object graph may be deserialized and stored in the memory of a computing device. The deserialized object graph may comprise objects with references to other objects, and as such may be similar to other graph forms, such as directed graphs. However, the object graph may lack the node-per-entity structure of the embodiment of a directed graph depicted in FIG. 2. The object graph may also lack the type field 216 and identifier(s) 218. Accordingly, as depicted by block 506, the binary-to-relational conversion module may convert the object graph to a directed graph with a form consistent with that of the directed graph that FIG. 2 depicts. This may comprise combining object graph node elements to form single-entity nodes, associating a type field 216 with each node, forming edges between nodes to represent relationships, and so on. A schema or mapping component and related configuration information may be applied during this process, so that the object graph is converted into the directed graph in a manner consistent with the intended database schema.

Block 508 depicts that the binary-to-relational conversion module may execute a graph query associated with a table to obtain an initial set of root nodes. As described herein, the root nodes may represent entities but due to relationships within the graph and by-products of the traversal process, the set of identified root nodes may contain multiple entity representations, or multiple partial representations, of a given entity.

As depicted by block 510, the root node set may be permuted to identify and count the number of unique entities represented by the root nodes. The obtained count may correspond to the number of rows of relational data that may be created by the conversion process.

Block 512 depicts that the entity-to-relational conversion module may populate a database table with rows corresponding to the entities identified as unique at block 510. Column values for the rows may be obtained using entity property access instructions, such as those depicted in FIG. 4, to locate properties for the entity whose properties are to be stored in a corresponding row of a relational table. A row may be formed to correspond to a given identity by applying each entity property access instruction to obtain a value, use additional information contained in the query to map from the value to a column, and then set the value of that column to the obtained value. The row is formed once this has been done for each row of the table.

The process may then be repeated for the next table, as depicted by block 514. The deserialized object graph and the resulting directed graph may contain data for multiple tables, such as a representations of various customers and each of those customer's orders. The process may be completed, as depicted by block 516, when data for each table has been imported.

Figure 6:
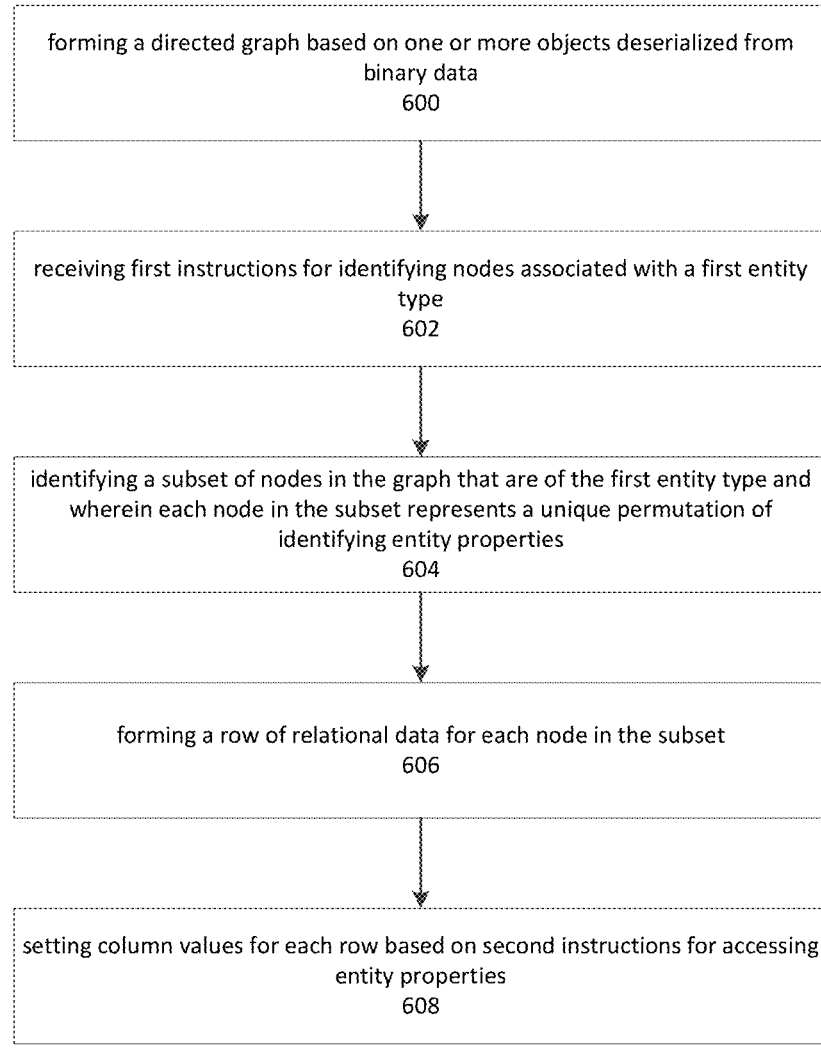
FIG. 6 is a flow diagram depicting an example of a process of converting binary objects to relational data.

FIG. 6 is a flow diagram depicting an example of a process of converting binary objects to relational data. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 depicts forming, by a binary-to-relational conversion module executing on a computing device, a directed graph using objects deserialized from binary data. The graph may comprise a number of nodes, where each node corresponds to an instance of an entity. Each node may be associated with a type, and each of the nodes may be linked by edges that represent relationships between nodes. Here, type refers to a classification of the entity. Examples of types include, for example, customers, orders, products, and so on.

Block 602 depicts receiving first instructions for identifying nodes that are associated with a first type of entity, and second instructions for identifying properties of entities of that type. The instructions may be provided as a query, a configuration file, or other data. In some cases, the instructions may be provided with additional data indicating associations between the instructions and a relational schema. For example, a relational table definition might identify a table, define columns of the table, define a mapping from the table to the first instructions for identifying entities, and provide mappings from the columns of the table to the second instructions for accessing properties of the entities.

Block 604 depicts identifying a subset of the nodes that is associated with the first type using the first instructions. The first instructions may comprise information for identifying root nodes of an entity. In addition, each node of the subset may be associated with a unique permutation of one or more properties of an entity. As explained herein, an initial set of rows identified using the instructions may be further reduced to form a subset of rows having unique permutations of properties. The properties having unique permutations may correspond to a compound primary key, for example.

In some cases, the binary-to-relational conversion module may form a count of the total number of distinct entities, of a given type, that are represented by a directed graph. The count may be formed by traversing the directed graph and applying the first instructions to traversed nodes. The count may be further refined by identifying unique permutations of node properties that correspond to compound key values. The number of rows formed may correspond to this count.

Block 606 depicts forming rows for a relational table, wherein the rows corresponds to the first subset of nodes. As noted, each node in the subset may be associated with the same entity type and also has a unique permutation of compound key values.

Block 608 depicts that column values for the rows may be obtained by applying the second instructions to access properties of the entity. The instructions may, for example, include information describing a path for traversing nodes of the graph and accessing a node property, and a mapping between that property and a column of a row that is to be created.

In an example, setting column values for a row may comprise traversing nodes that are linked to a node that corresponds to an entity, such as a root node, identifying properties of the entity by applying the second instructions to the traversed nodes, and setting a value of a column of the row based on the identified property.

In some cases, the binary-to-relational conversion module may receive information providing related first and second instruction pairs, and associating each pair with a relational database table. The tables may be those to be populated by applying the plurality of first and second instruction pairs to a directed graph. As noted, a single directed graph, obtained from binary data, may be used to populate multiple tables.

Figure 7:
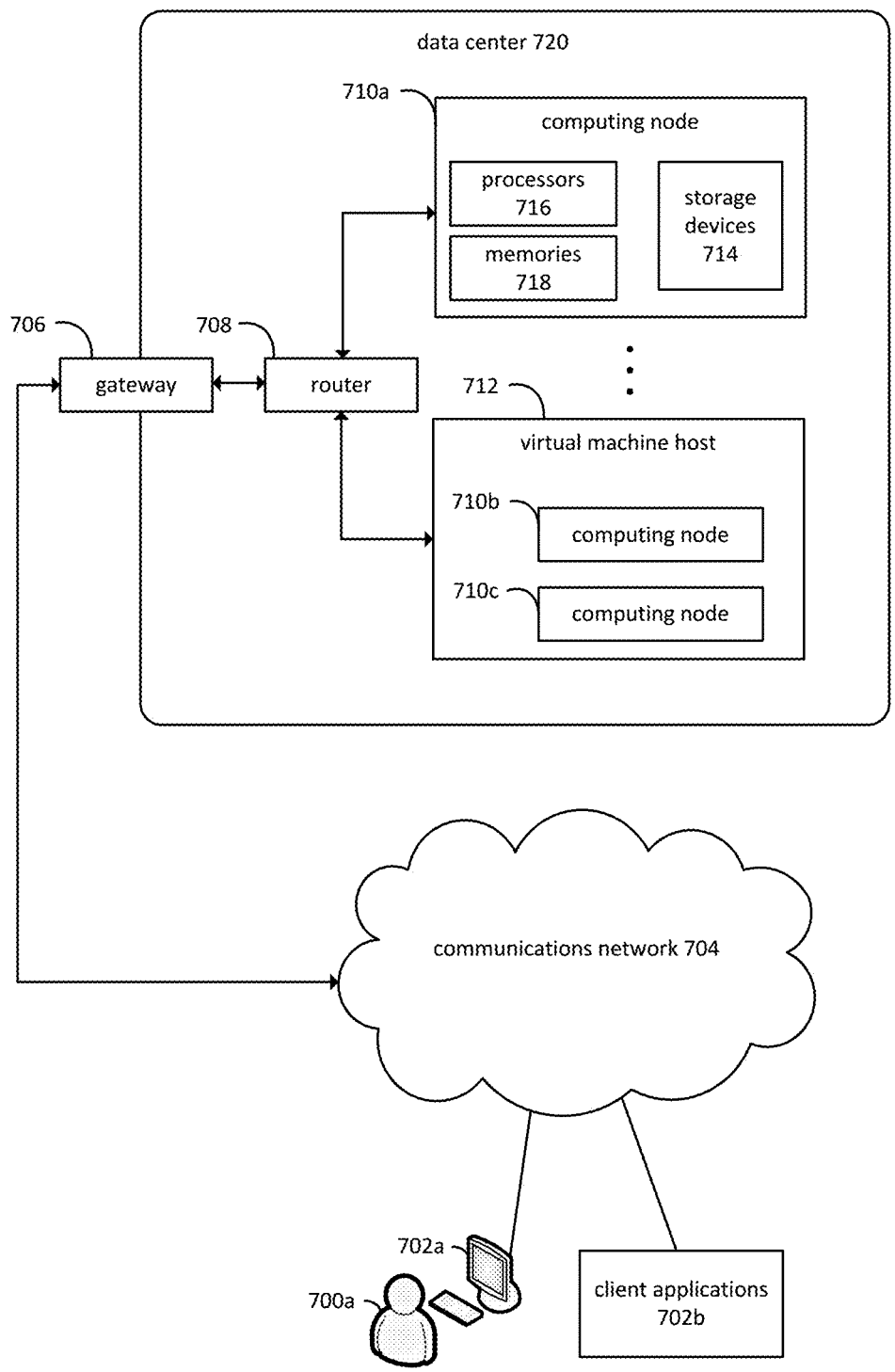
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 804 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710*a* is depicted as residing on physical hardware comprising one or more processors 716, one or more memories 818, and one or more storage devices 714. Processes on computing node 710*a* may execute in conjunction with an operating system or alternatively may execute as a bare-metal process that directly interacts with physical resources, such as processors 716, memories 718, or storage devices 714.

Computing nodes 710*b* and 710*c* are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
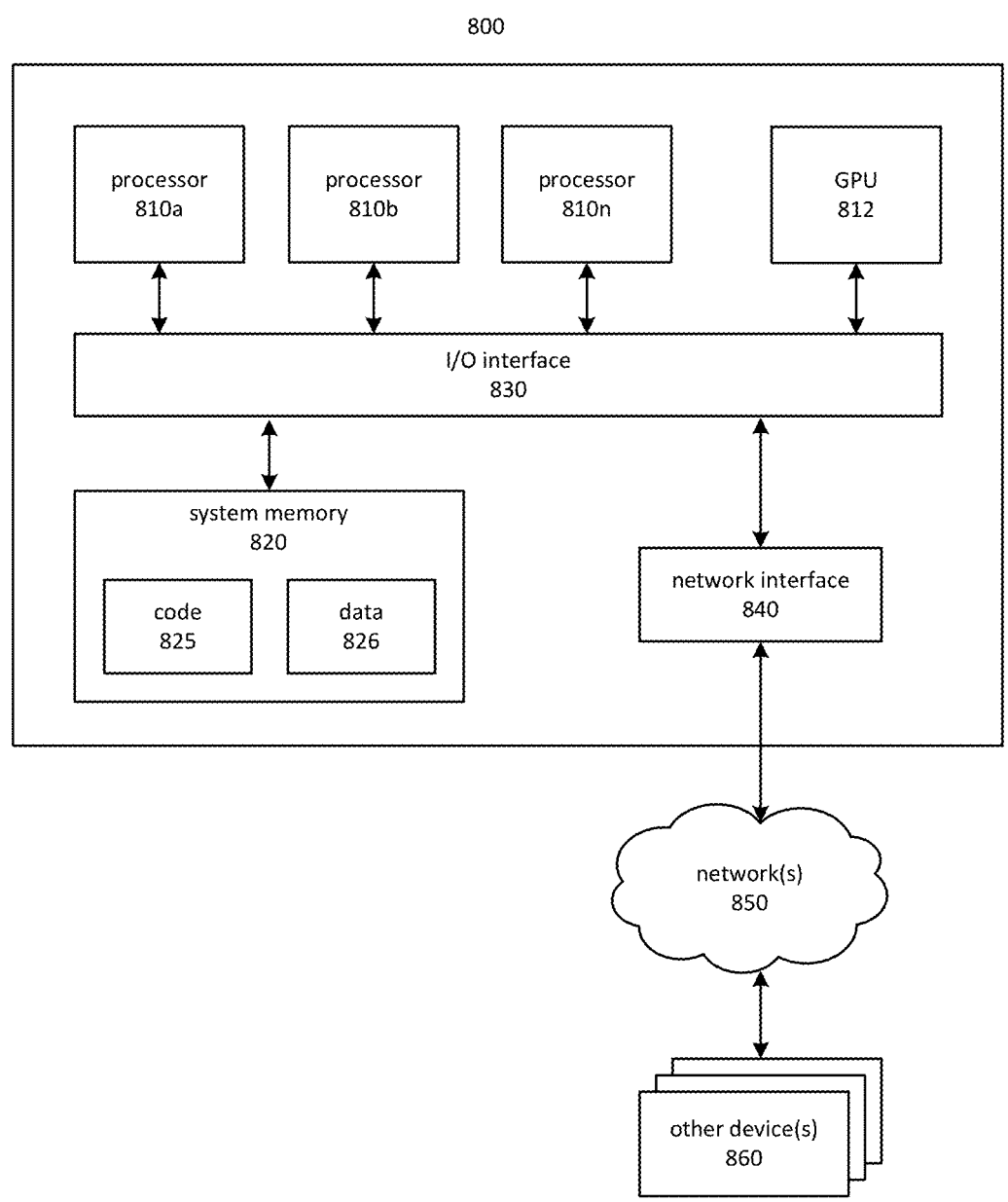
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810*a*, 810*b*, and/or 810*n* (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 910. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 820 may be reconfigured by the operation of one or more of the processors 810. The processors 810 may execute the instructions of a code module and thereby reconfigure the system memory 820 to form data structures and data elements. Forming a data element may therefore refer to operations of the processor 810 to reconfigure the system memory 820. The GPU 812, network interface 840, and I/O interface may also, in some cases, form data structures by reconfiguring the system memory 820. Accordingly, the terms "form" and "forming" may also refer to the operations of these and other devices 860 which may cause the a data structure or data element to be stored in the system memory 820.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a storage device;
   at least one processor; and
   at least one memory comprising processor-executable instructions that, in response to execution by the at least one processor, cause the system to at least:
   load a first graph into the at least one memory, by at least deserializing one or more serialized objects from the storage device to create one or more deserialized objects, wherein the one or more deserialized objects comprise information indicative of relationships between entities;
   form a second graph based at least in part on conversion of the first graph into a format indicative of the relationships between entities, wherein the second graph comprises a plurality of nodes, wherein each node of the plurality of nodes corresponds to an entity of one of a plurality of types, wherein nodes of the plurality of nodes are linked by edges representative of the relationships between entities;
   receive first instructions for identifying nodes of the plurality of nodes associated with a first type of the plurality of types and second instructions for identifying one or more properties of entities of the first type, the second instructions indicating access information indicative of the one or more properties of the entities of the first type;
identify a first subset of the plurality of nodes that correspond to entities of the first type, the first subset identified based at least in part on the first instructions, wherein each node in the first subset is associated with a unique permutation of values of one or more properties of an entity of the first type;
form a plurality of rows for insertion into a database table based on the identified first subset of the plurality of nodes, wherein the plurality of rows corresponds to the first subset of the plurality of nodes that correspond to the entities of the first type, wherein columns of the plurality of rows are obtained based at least in part on applying the second instructions to the first subset of the plurality of nodes; and
insert the plurality of rows into the database table.

2. The system of claim 1, the at least one memory comprising further processor-executable instructions that, in response to execution by the at least one processor, cause the system to:
identify a first node of the first subset of the plurality of nodes, the first node corresponding to a first entity;
traverse one or more of the plurality of nodes that are linked to the first node;
identify one or more properties of the first entity based at least in part on applying the second instructions to the traversed one or more of the plurality of nodes; and
obtain a value of a column based at least in part on the identified one or more properties.

3. The system of claim 1, the at least one memory comprising further processor-executable instructions that, in response to execution by the at least one processor, cause the system to:
obtain a count of a total number of distinct entities of the first type in the plurality of nodes by at least traversing nodes of the plurality of nodes and applying the first instructions to traversed nodes.

4. The system of claim 1, wherein the first instructions comprise criteria for identifying a root node of an entity.

5. The system of claim 4, wherein the second instructions comprise information indicative of a path for traversing one or more of the plurality of nodes linked to the root node.

6. (Currently) A computer-implemented method, comprising:
forming a graph based at least in part on one or more binary representations of objects, the one or more binary representations comprising information indicative of relationships between entities, wherein the graph comprises a plurality of nodes, wherein each node of the plurality corresponds to one of the entities, the one of the entities associated with one of a plurality of types, wherein nodes of the plurality of nodes are linked by edges representative of the relationships between entities;
receiving first instructions for identifying nodes of the plurality of nodes associated with a first type of the plurality of types and second instructions for identifying properties of entities of the first type, the second instructions indicating access information indicative of the properties of the entities of the first type;
identifying a first subset of the plurality of nodes that correspond to entities of the first type, the first subset identified based at least in part on the first instructions, wherein each node in the first subset is associated with a unique permutation of values of one or more properties of an entity, wherein the values of the one or more properties are obtained by applying the second instructions; and
storing a plurality of rows in a relational database table based on the identified first subset of the plurality of nodes, wherein the plurality of rows are based on the first subset of the plurality of nodes that correspond to entities of the first type, wherein columns of the plurality of rows are obtained based at least in part on applying the second instructions to the first subset of the plurality of nodes.

7. The method of claim 6, further comprising:
traversing one or more of the plurality of nodes that are linked to a first node, of the first subset of the plurality of nodes, that corresponds to a first entity;
identifying one or more properties of the first entity based at least in part on applying the second instructions to the traversed one or more of the plurality of nodes; and
identifying a value of a column based at least in part on the identified one or more properties.

8. The method of claim 6, further comprising:
forming a count of a total number of distinct entities of the first type in the plurality of nodes by at least traversing nodes of the plurality of nodes and applying the first instructions to traversed nodes.

9. The method of claim 8, wherein a number of rows in the plurality of rows corresponds to the count.

10. The method of claim 6, wherein the unique permutation of one or more properties of an entity corresponds to a primary key of a row of the plurality of rows.

11. The method of claim 6, wherein the first instructions comprise criteria for identifying a root node of an entity.

12. The method of claim 11, wherein the second instructions comprise information indicative of a path for traversing one or more of the plurality of nodes linked to the root node.

13. The method of claim 6, further comprising:
receiving information indicative of a plurality of first and second instruction pairs associated with a plurality of tables, the plurality of tables to be populated based on applying the plurality of first and second instruction pairs to the graph.

14. A non-transitory computer-readable storage medium having stored thereon executable instructions that, upon execution by a computing device, cause the computing device at least to:
form a graph based at least in part on one or more objects deserialized from binary data, the one or more objects comprising information indicative of relationships between two or more entities, wherein the graph comprises a plurality of nodes, wherein each node of the plurality corresponds to an entity of one of a plurality of types, wherein two or more nodes of the plurality of nodes are linked by edges representative of the relationships between the two or more entities;
receive first instructions for identifying nodes of the plurality of nodes associated with a first type of the plurality of types and second instructions for identifying properties of entities of the first type, the second instructions indicating access information indicative of the properties of the entities of the first type;
identify a first subset of the plurality of nodes that correspond to entities of the first type, the first subset identified based at least in part on the first instructions, wherein each node in the first subset is associated with a unique permutation of values of one or more properties of an entity, wherein the values of the one or more properties are obtained by applying the second instructions; and form a plurality of rows based on the identified first subset of the plurality of nodes, wherein the plurality of rows corresponds to the first subset of the plurality of nodes that correspond to the entities of the first type, wherein columns of the plurality of rows are obtained based at least in part on applying the second instructions to the first subset of the plurality of nodes.

15. The non-transitory computer-readable storage medium of claim 14, comprising further instructions that, upon execution, cause the computing device to at least:

traverse one or more of the plurality of nodes that are linked to a first node, of the first subset of the plurality of nodes, that corresponds to a first entity;

identify one or more properties of the first entity based at least in part on applying the second instructions to the traversed one or more of the plurality of nodes; and identify a value of a column based at least in part on the identified one or more properties.

16. The non-transitory computer-readable storage medium of claim 14, comprising further instructions that, upon execution, cause the computing device to at least:

form a count of a total number of distinct entities of the first type in the plurality of nodes by at least traversing nodes of the plurality of nodes and applying the first instructions to traversed nodes.

17. The non-transitory computer-readable storage medium of claim 16, comprising further instructions that, upon execution, cause the computing device to at least:

form a number of rows equivalent to the count.

18. The non-transitory computer-readable storage medium of claim 14, wherein the unique permutation of one or more properties of an entity corresponds to a primary key of a row of the plurality of rows.

19. The non-transitory computer-readable storage medium of claim 14, wherein the first instructions comprise criteria for identifying a root node of an entity.

20. The non-transitory computer-readable storage medium of claim 19, wherein the second instructions comprise information indicative of a path for traversing one or more of the plurality of nodes linked to the root node.

\* \* \* \* \*